United States Patent [19]

Novak

[11] 4,321,000
[45] Mar. 23, 1982

[54] CONTAINER REPAIR SPACER SYSTEM

[76] Inventor: John Novak, 8830 Fairway Dr., Orland Park, Ill. 60462

[21] Appl. No.: 143,540

[22] Filed: Apr. 25, 1980

[51] Int. Cl.³ .............................. B60S 9/22; B60P 7/13
[52] U.S. Cl. ........................................ 410/76; 410/82; 269/309; 248/351; 296/35.3
[58] Field of Search ............................ 296/35.3, 35.1; 280/DIG. 8; 410/71, 72, 73, 76, 82, 83, 84, 89, 90, 91; 248/351; 269/309; 220/69

[56] References Cited

U.S. PATENT DOCUMENTS

| | | | |
|---|---|---|---|
| 2,975,933 | 3/1961 | Abolins | 220/69 |
| 3,389,663 | 6/1968 | Gutridge | 410/82 |
| 3,752,511 | 8/1973 | Racy | 410/82 |
| 4,026,596 | 5/1977 | Carr | 410/82 |

Primary Examiner—Robert R. Song
Attorney, Agent, or Firm—Dressler, Goldsmith, Shore, Sutker & Milnamow, Ltd.

[57] ABSTRACT

A system for safely, efficiently and effectively spacing and holding a removable container of a truck above its chassis to readily facilitate servicing and repair of the container. The system features a plurality of container repair spacer assemblies which separate the container from its chassis. Each container repair spacer assembly has a base with an opening that engagably receives one of chassis' twist locks and a collar which abuts against and supports the container frame. Upright walls connect the base and collar and provide the desired amount of spacing between the container and its chassis. A locking member, such as a twist lock, extends above the collar to interlockingly engage an opening in the frame of the container to detachably secure the container frame to the container repair spacer assembly. Controls, such as a handle operatively connected an upright shaft, are provided to selectively pivot the twist lock from an insertion or removal position to a locking position.

33 Claims, 5 Drawing Figures

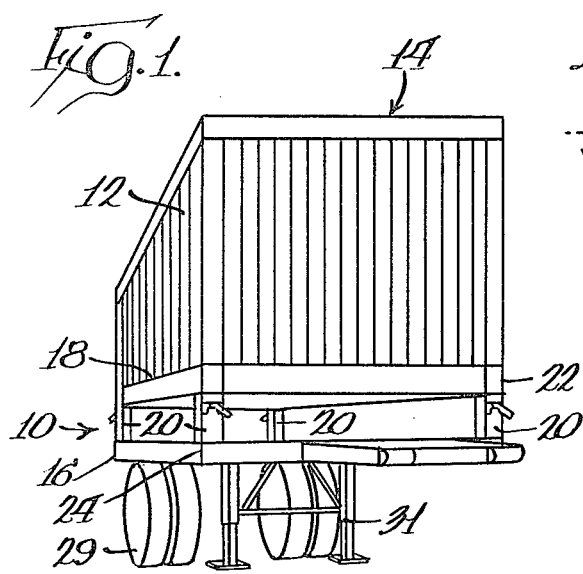
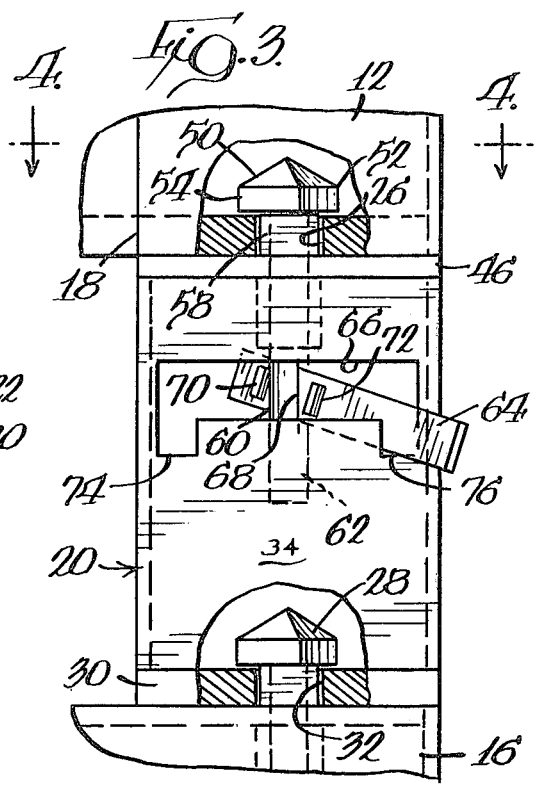
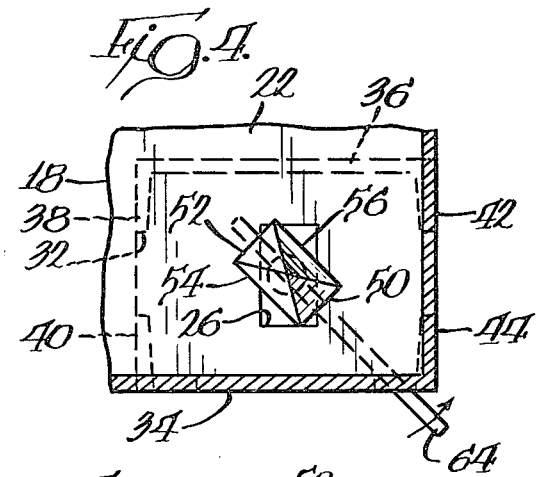
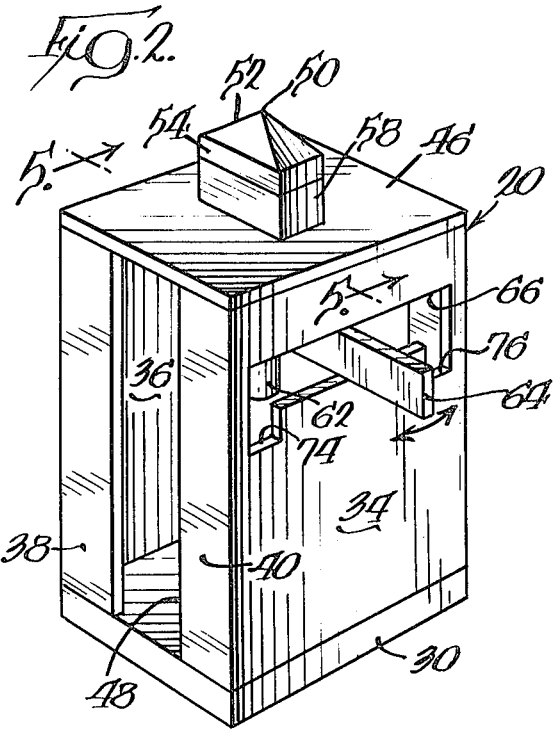
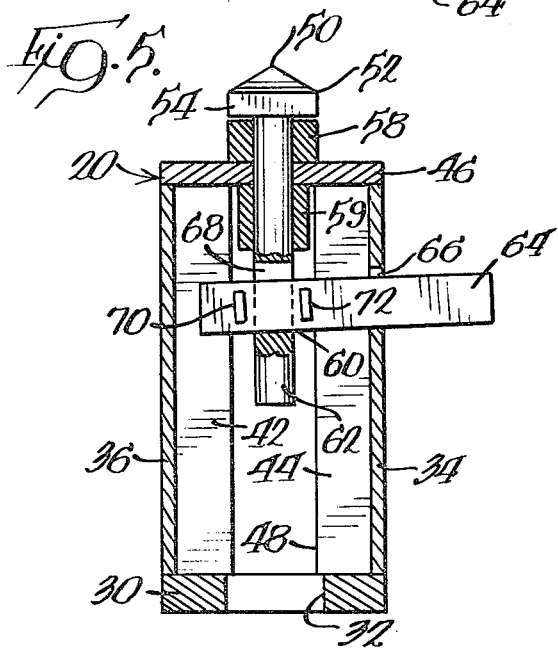

CONTAINER REPAIR SPACER SYSTEM

TECHNICAL FIELD OF THE INVENTION

This invention relates to systems which facilitate servicing and repair of truck containers, and more particularly, to a system which spaces and holds a truck container above its chassis to facilitate servicing and repair of the cross members and undercarriage of the container frame.

BACKGROUND OF THE INVENTION

Servicing and repair of the cross members and undercarriage of the container frame is extremely time consuming, burdensome and unsafe in trucks with containers which are separable from their chassis.

Conventionally, wooden blocks are placed between the container frame and chassis to separate the container from the chassis after the container has been lifted above the chassis with a hydraulic jack or the like. If the blocks are inadvertently kicked out of position by the repairman, or if too much torque is exerted against the container or blocks during repair or if the chassis is moved across uneven ground to a more suitable location, the instability of the wooden blocks may cause the container to collapse upon the chassis. Collapse of the container may not only damage the container and chassis but would also present a very dangerous working condition for the repairman.

It is therefore desirable to provide an improved system which spaces and holds a container above its chassis to facilitate servicing and repair of the container.

SUMMARY OF THE INVENTION

An improved system is provided which safely, efficiently and effectively spaces and holds a container of a truck above its chassis to facilitate servicing and repair of the cross members and undercarriage of the container frame. The novel system permits the chassis to be wheeled to another location without fear of container collapse and is easy to use.

To this end, the system features a plurality of specially constructed container repair spacer assemblies which securely hold and separate the container frame and chassis. Each container repair spacer assembly has a base which interlockingly engages and removably receives a portion of the chassis, such as a twist lock extending upward from the chassis, to detachably secure the container repair spacer assembly to the chassis.

The container repair spacer assembly also has a locking member, which is preferably in the form of a twist lock, to interlockingly engage and secure the container repair spacer assembly to the frame of the container. A frame-engaging collar is positioned about the twist lock of the container repair spacer assembly which abuts against the underside and supports the container frame. Walls extend between and connect the collar and the base to provide the desired amount of spacing and separation between the container frame and chassis.

Advantageously, the container repair spacer assembly has controls, which preferably take the form of a generally upright shaft, which is connected to the twist lock, and a handle which is operatively connected to the shaft, to move the twist lock from an insertion and removal position to a locking position. A specially configured opening in the wall limits the angular movement of the handle and twist lock.

A more detailed explanation of the invention is provided in the following description and appended claims taken in conjunction with the accompanying drawings.

BRIEF DESCRIPTION OF THE DRAWINGS

FIG. 1 is a perspective view of a system for spacing and holding a container of a truck above its chassis in accordance with principles of the present invention;

FIG. 2 is an enlarged perspective view of one of the container repair spacer assemblies of the system;

FIG. 3 is a cross-sectional view of the front of the container repair spacer assembly;

FIG. 4 is a cross-sectional view of the container repair spacer assembly taken substantially along line 4—4 of FIG. 3; and FIG. 5 is a cross-sectional view of the side of the container repair spacer assembly.

DETAILED DESCRIPTION OF THE PREFERRED EMBODIMENT

Referring now to FIG. 1 of the drawings, a container repair and servicing system 10 is provided which safely and securely spaces, separates and holds a container 12 of a truck 14 above its wheeled chassis 16 to facilitate servicing and repair of the cross-members and undercarriage of the container's frame or base 18. In the illustrated system, four container repair and servicing spacer assemblies 20 are positioned between and aligned in registration with the corner castings 22 of the container's frame 18 and the corners 24 of chassis 16.

In the illustrative embodiment, each corner casting of container frame 18 has an oblong twist lock-receiving opening 26 (FIG. 4) with a length greater than its width and each of the chassis' corners 24 has a rotatable bayonet style twist lock 28 (FIG. 3) extending upward. Mobile chassis 16 (FIG. 1) has wheels 29 and dolly legs 31.

In order to detachably secure the container repair spacer assemblies 20 to chassis 16, each of the container repair spacer assemblies 20 has a base 30 (FIG. 3) with a channel-shaped opening 32. Opening 32 removably and slidably receives the chassis' twist lock 28 when the twist lock is pivoted to an insertion position. Chassis twist lock 28 locks into engagement with base 30 when pivoted to a locking position as shown in FIG. 3.

The side walls 34 and 36 and end walls 38, 40, 42 and 44 (FIGS. 2 and 4) of container repair spacer assembly 20 extend vertically between and connect base 30 to plate-like collar 46 to provide the amount of spacing and separation between container frame 18 and chassis 16 to permit repairmen to work on frame 18. Walls of greater height can be provided to enlarge the amount of space between container frame 18 and chassis 16 and walls of lesser height can be provided to decrease the amount of space between chassis 16 and container frame 18.

In the embodiment shown, walls 34 and 36 provide the front and rear walls, respectively, of the container repair spacer assembly 20, and each pair of end walls 38 and 40 and 42 and 44, respectively, are spaced apart from each other to provide an access opening 48 (FIG. 2) therebetween. Access opening 48 permits ready access to the parts components of container repair spacer assembly 20 and reduces the costs and weight of the material needed to fabricate spacer assembly 20. In the embodiment shown, base 30 and collar 46 are made of rectangular plates and cooperate with walls 34–44 to provide a box-like housing for the spacer assembly 20.

In order to detachably secure the container repair spacer assemblies 20 to container frame 18, each container repair spacer assembly 20 has a generally upright rotatable locking member extending above collar 46 in the form of a pivotable twist lock 50. Twist lock 50 has a frusto-conical head 52 with elongated side walls 54 and 56 (FIG. 4). Side walls 54 and 56 of head 52 span a length greater than the width of the corner casting's twist lock-receiving opening 26 but less than the length of the opening 26 to facilitate locking and removal and insertion, respectively, of twist lock head 52 into corner casting opening 26. The width of twist lock head 52 is slightly smaller than the width of corner casting opening 26 to permit insertion of head 52 into opening 26.

Twist lock head 50 is positioned above and rotates upon a twist shoulder 58 which extends above collar 46. In the illustrated embodiment, twist shoulder 58 has the same cross-sectional area as head 50 as viewed in top plan view and is generally rectangular. In some circumstances, however, it may be desirable that twist shoulder be smaller than head 50 or of a different shape.

The container repair spacer assembly also has controls in the form of a control assembly 60 (FIGS. 3 and 5) to selectively pivot and twist twist lock 50 about its vertical axis from an insertion and removal position wherein the elongated side walls 54 and 56 of twist lock head 52 are positioned in the same general direction as the length of twist lock-receiving opening 26 to insert and remove twist lock 50 into and out of twist lock opening 26, to a locking or servicing and repair position wherein the elongated side walls 54 and 56 of twist lock 50 are positioned generally transverse or at an angle to the length of twist lock opening 26 to lock twist lock 50 to container frame 18. Controls 60 include an upright slotted shaft 62 (FIGS. 3 and 5) connected to the underside of twist lock head 52, a manually graspable handle 64 for pivoting shaft 62 about a vertical axis and an inverted U-shaped handle receiving channel or opening 66 (FIGS. 2 and 3) in front wall 34.

Shaft 62 (FIGS. 3 and 5) has a rectangular handle-receiving slot 68 which is elongated in the vertical direction. The rearward portions of handle 64 pass through slot 68 and are pivotable in a vertical direction therein. A pair of locking pins 70 and 72 adjacent the front and rear portions, respectively, of shaft 62 laterally secure handle 64 to shaft 62.

In the illustrative embodiment, handle 64 is generally rectangular and flat and pivots in a general horizontal direction about the vertical axis of shaft 62. In some circumstances, however, it may be desirable, that handle 64 be of a different shape or be cylindrical, or that it have a rubber grip along its front portions to facilitate gripping.

Front wall opening 66 (FIGS. 2 and 3) has the shape of an inverted U and slidably receives handle 64. The horizontal span of front wall opening 66 limits the extent to which handle 64 can be pivoted and, therefore, subsequently limits the angular displacement and extent shaft 62 and twist lock 50 can be pivoted about their vertical axis. In the preferred embodiment, handle 64, shaft 62 and twist lock 50 pivot about 45 degrees from an insertion and removal position to a locking position. In the illustrative embodiment, front wall opening has a U-shaped portion 74 along its left-hand side for locking handle 64 in the insertion and removal position and has another U-shaped portion 76 along its right-hand side to lock the handle in the locking position.

In order to service or repair the cross-members and undercarriage of container frame 18, container 12 is lifted by a hydraulic power lift or the like above its chassis 16 a sufficient distance to allow container repair spacers 22 to be placed between container frame 18 and chassis 16. Chassis twist locks 28 are pivoted to an insertion position, if they are not already in that position and the container repair spacers 20 are positioned in registration with chassis twist locks 28 and corner openings 26 of container 12. Each container repair spacer 20 is slid into engagement with its respective chassis twist lock 28 and the chassis twist lock 28 is pivoted to lock the chassis and container repair spacer securely together.

Handle 64 is slid horizontally and pivoted downward into the left-hand portion 74 of front wall opening 66 to move the container repair spacer's twist lock 50 to an insertion position, if it has not been previously moved to that position. Container 12 is lowered until container repair spacer twist locks 50 engage corner openings 26. The handle 64 of each container repair spacer assembly 20 is then moved upward out of the left-hand portion 74 of opening 66, slid to the right and moved downward into the right-hand portion 76 of opening 66. Such action will move container repair spacer's twist lock 50 from an insertion position, wherein the side walls of 54 and 56 of twist lock head 52 are aligned in the same general direction as the length of corner opening 26, to a locking position wherein the side walls 54 and 56 of twist lock head 52 are positioned at an obtuse angle, such as at about 135 degrees, to the length of the corner opening 26 to securely lock the container repair spacer assembly 20 and container frame 18 together. Chassis 16 can now be safely wheeled to another working area and the cross-member and undercarriage of container frame 18 repaired because container 12 is securely connected and interlockingly engaged to chassis 16 by container repair spacer assemblies 20. Once servicing and repair has been completed, the above procedure should be reversed to secure container 12 directly to chassis 16.

Although an embodiment of the invention has been shown and described, it is to be understood that various modifications and substitutions can be made by those skilled in the art without departing from the novel spirt and scope of this invention.

What is claimed is:
1. A system for spacing and holding a container of a truck above its chassis to facilitate servicing and repair of the container, comprising:
   a chassis for removably carrying and supporting said container, said chassis having a plurality of chassis twist locks;
   a container having a frame defining a plurality of frame-engaging twist lock-receiving openings, each frame-engaging twist lock-receiving opening having a length greater than its width; and
   a plurality of container repair spacer assemblies for spacing said container above said chassis, at least one of said container repair spacer assemblies having
   a base defining a chassis twist lock-receiving opening for removably receiving and interlockingly engaging one of said chassis twist locks to detachably secure said container repair spacer assembly to said chassis,
   a frame-engaging twist lock insertable into one of said frame-engaging twist lock-receiving openings of said container frame, said frame-engaging twist lock having elongated side walls spanning a length greater than the width of said frame-engaging twist lock-receiving opening of said container frame but less than the length of said frame-engaging twist lock-receiving opening, a collar positioned about each said frame-engaging twist lock for abuttingly engaging and supporting said container frame, wall means extending between and connecting said collar and said base, and control means for moving said frame-engaging twist lock between (1) an insertion and removal position wherein said elongated side walls are positioned in the same general direction as the length of said twist lock-receiving opening in said frame for permitting insertion and removal of said frame-engaging twist lock of said container repair spacer assembly relative to said frame-engaging twist lock-receiving opening of said container frame and (2) a locking position wherein said elongated side walls are positioned generally transverse to the length of said frame-engaging twist lock-receiving opening in said frame for locking said frame-engaging twist lock to said container frame.

2. A system for spacing and holding a container of a truck above its chassis in accordance with claim 1 wherein said frame-engaging twist lock has a frustoconical head.

3. A system for spacing and holding a container of a truck above its chassis in accordance with claim 2 wherein said frame-engaging twist lock has a shoulder for rotatably supporting said head.

4. A system for spacing and holding a container of a truck above its chassis in accordance with claim 1 wherein said control means includes a shaft operatively connected to said frame-engaging twist lock and a manually graspable handle operatively connected to said shaft.

5. A system for spacing and holding a container of a truck above its chassis in accordance with claim 4 wherein said control means includes a handle-receiving opening defined in said wall means.

6. A system for spacing and holding a container of a truck above its chassis in accordance with claim 5 wherein said handle-receiving opening is of a width to limit movement of said handle and said frame-engaging twist lock to less than 90 degrees.

7. A system for spacing and holding a container of a truck above its chassis in accordance with claim 5 wherein said handle-receiving opening is of a width to limit movement of said handle and said frame-engaging twist lock to about 45 degrees.

8. A system for spacing and holding a container of a truck above its chassis in accordance with claim 5 wherein said handle-receiving opening has a first portion for locking said handle and said frame-engaging twist lock in said insertion and removal position.

9. A system for spacing and holding a container of a truck above its chassis in accordance with claim 5 wherein said handle-receiving opening has a second portion for locking said handle and said frame-engaging twist lock in said locking position.

10. A system for spacing and holding a container of a truck above its chassis in accordance with claim 4 wherein said handle is pivotably connected to said shaft.

11. A system for spacing and holding a container of a truck above its chassis in accordance with claim 10 wherein said shaft defines a slot extending therethrough for pivotally receiving portions of said handle, and said handle has at least one pin laterally securing said handle to said shaft.

12. A spacer assembly for spacing and supporting a container frame of a truck above its chassis to facilitate servicing and repair of the container, said chassis having at least one upwardly projecting chassis twist lock, said assembly comprising: a base defining an opening for removably receiving and interlockingly engaging said chassis twist lock on said chassis, a locking member for engaging said container frame, a collar positioned about said locking member for abuttingly engaging and supporting said container frame, wall means extending between and connecting said collar and said base, and control means separate from said base, collar, and wall means for moving said locking member from an insertion and removal position for permitting insertion and removal of said locking member relative to said container frame to a locking position for releasably locking said locking member to said container frame.

13. A spacer assembly for spacing and holding a container frame of a truck above its chassis in accordance with claim 12 wherein said locking member includes a frame-engaging twist lock.

14. A spacer assembly for spacing and holding a container frame of a truck above its chassis in accordance with claim 13 wherein said twist lock has a frusto-conical head.

15. A spacer assembly for spacing and holding a container frame of a truck above its chassis in accordance with claim 14 wherein said frame-engaging twist lock has a shoulder for rotatably supporting said head.

16. A spacer assembly for spacing and holding a container frame of a truck above its chassis in accordance with claim 12 wherein said control means includes a shaft operatively connected to said locking member and a manually graspable handle operatively connected to said shaft.

17. A spacer assembly for spacing and holding a container frame of a truck above its chassis in accordance with claim 16 wherein said control means includes a handle-receiving opening defined in said wall means.

18. A spacer assembly for spacing and holding a container frame of a truck above its chassis in accordance with claim 17 wherein said handle-receiving opening is of a width to limit movement of said handle and said locking member to less than 90 degrees.

19. A spacer assembly for spacing and holding a container frame of a truck above its chassis in accordance with claim 17 wherein said handle-receiving opening is of a width to limit movement of said locking member to about 45 degrees.

20. A spacer assembly for spacing and holding a container frame of a truck above its chassis in accordance with claim 17 wherein said handle-receiving opening has a first portion for locking said handle and said locking member in said insertion and removal position.

21. A spacer assembly for spacing and holding a container frame of a truck above its chassis in accordance with claim 17 wherein said handle-receiving opening has a second portion for locking said handle and said locking member in said locking position.

22. A spacer assembly for spacing and holding a container frame of a truck above its chassis in accordance with claim 16 wherein said handle is pivotally connected to said shaft.

23. A spacer assembly for spacing and holding a container frame of a truck above its chassis in accordance with claim 22 wherein said shaft defines a slot extending therethrough for pivotally receiving a portion of said handle and said handle has at least one pin laterally securing said handle to said shaft.

24. A system for spacing and holding a container of a truck above its chassis to facilitate servicing and repair of the container, comprising:
a container having a frame with corner castings, each corner casting defining an oblong twist lock-receiving opening having a length greater than its width;
a chassis for removably carrying and supporting said container, said chassis having a plurality of twist locks generally aligned in registration with said openings of said container frame; and
a plurality of container repair spacer assemblies for spacing said container above said chassis, each of said container repair spacer assemblies having a base defining a channel-shaped opening for removably receiving one of said twist locks of said chassis to detachably secure said spacer assembly to said chassis, a twist lock insertable into one of said twist lock-receiving openings of said container frame, said twist lock having a frusto-conical head with elongated side walls spanning a length greater than the width of said oblong opening but less than the length of said oblong opening, a generally upright shaft operatively connected to said twist lock, said shaft defining a handle-receiving slot elongated in a generally vertical direction, a manually graspable handle having a portion passing through and vertically pivotable in said handle-receiving slot, at least one pin laterally securing said handle to said shaft, a collar positioned about said container repair assembly twist lock for abuttingly engaging and supporting said container frame, wall means extending between and connecting said collar and said base and defining an inverted U-shaped handle-receiving channel having one portion for locking said handle in an insertion and removal position wherein said elongated side walls of said twist lock of said container repair spacer assembly are positioned in the same general direction as the length of said oblong twist lock-receiving opening of said container frame for inserting and removing said twist lock from said oblong opening and another portion for locking said handle in a locking position wherein said elongated side walls of said twist lock of said container repair spacer assembly are positioned at an angle relative to the length of said oblong opening for locking said twist lock to said container frame.

25. A system for spacing and holding a container of a truck above its chassis in accordance with claim 24 wherein said U-shaped channel has a horizontal span that limits movement of said twist lock to about 45 degrees.

26. A spacer assembly for spacing and supporting a container frame of a truck above its chassis to facilitate servicing and repair of the container, comprising: a base defining an opening for removably receiving and interlockingly engaging a portion of said chassis, a locking member for engaging said container frame, a collar positioned about said locking member for abuttingly engaging and supporting said container frame, wall means extending between and connecting said collar and said base, and control means for moving said locking member between (1) an insertion and removal position for permitting insertion and removal of said locking member relative to said container frame and (2) a locking position for releasably locking said locking member to said container frame, said locking member including a frame-engaging twist lock, said frame-engaging twist lock having a frustoconical head and a shoulder for rotatably supporting said head.

27. A spacer assembly for spacing and supporting a container frame of a truck above its chassis to facilitate servicing and repair of the container, comprising: a base defining an opening for removably receiving and interlockingly engaging a portion of said chassis, a locking member for engaging said container frame, a collar positioned about said locking member for abuttingly engaging and supporting said container frame, wall means extending between and connecting said collar and said base, and control means for moving said locking member between (1) an insertion and removal position for permitting insertion and removal of said locking member relative to said container frame and (2) a locking position for releasably locking said locking member to said container frame, said control means including a shaft operatively connecting to said locking member, a manually graspable handle operatively connected to said shaft, and a handle-receiving opening defined in said wall means.

28. A spacer assembly for spacing and holding a container frame of a truck above its chassis in accordance with claim 27 wherein said handle-receiving opening is of a width to limit movement of said handle and said locking member to less than 90 degrees.

29. A spacer assembly for spacing and holding a container frame of a truck above its chassis in accordance with claim 27 wherein said handle-receiving opening is of a width to limit movement of said locking member to about 45 degrees.

30. A spacer assembly for spacing and holding a container frame of a truck above its chassis in accordance with claim 27 wherein said handle-receiving opening has a first portion for locking said handle and said locking member in said insertion and removal position.

31. A spacer assembly for spacing and holding a container frame of a truck above its chassis in accordance with claim 27 wherein said handle-receiving opening has a second portion for locking said handle and said locking member in said locking position.

32. A spacer assembly for spacing and holding a container frame of a truck above its chassis in accordance with claim 27 wherein said handle is pivotably connected to said shaft.

33. A spacer assembly for spacing and holding a container frame of a truck above its chassis in accordance with claim 32 wherein said shaft defines a slot extending therethrough for pivotally receiving a portion of said handle and wherein said handle has at least one pin laterally securing said handle to said shaft.

* * * * *